United States Patent
Delio, Jr.

(10) Patent No.: US 12,182,590 B1
(45) Date of Patent: Dec. 31, 2024

(54) TARGET PROCESS INJECTION PRIOR TO EXECUTION OF MARKER LIBRARIES

(71) Applicant: Riverbed Technology, LLC, San Francisco, CA (US)

(72) Inventor: John J. Delio, Jr., Manchester, NH (US)

(73) Assignee: Riverbed Technology LLC, Redwood City, CA (US)

( * ) Notice: Subject to any disclaimer, the term of this patent is extended or adjusted under 35 U.S.C. 154(b) by 0 days.

(21) Appl. No.: 18/502,373

(22) Filed: Nov. 6, 2023

Related U.S. Application Data (63) Continuation of application No. 15/347,496, filed on Nov. 9, 2016, now Pat. No. 11,809,881.

(60) Provisional application No. 62/253,531, filed on Nov. 10, 2015.

(51) Int. Cl.
 *G06F 9/44* (2018.01)
 *G06F 9/445* (2018.01)
 *G06F 11/34* (2006.01)
 *G06F 11/36* (2006.01)

(52) U.S. Cl.
 CPC .......... *G06F 9/44521* (2013.01); *G06F 11/34* (2013.01); *G06F 11/36* (2013.01)

(58) Field of Classification Search
 CPC ....... G06F 9/44521; G06F 11/34; G06F 11/36
 See application file for complete search history.

(56) References Cited

U.S. PATENT DOCUMENTS

| | | | | |
|---|---|---|---|---|
| 6,499,137 | B1* | 12/2002 | Hunt | G06F 9/44521 |
| | | | | 717/177 |
| 2005/0097294 | A1* | 5/2005 | Hepkin | G06F 12/08 |
| | | | | 711/170 |
| 2014/0304720 | A1* | 10/2014 | Yu | G06F 9/44521 |
| | | | | 719/331 |
| 2016/0154657 | A1* | 6/2016 | Lee | G06F 9/44536 |
| | | | | 717/164 |
| 2017/0329621 | A1* | 11/2017 | Beckett | G06F 8/447 |

\* cited by examiner

*Primary Examiner* — Chat C Do
*Assistant Examiner* — Lenin Paulino
(74) *Attorney, Agent, or Firm* — Park, Vaughan, Fleming & Dowler LLP; Laxman Sahasrabuddhe (57) ABSTRACT

A lock may be acquired on a virtual memory of a target process, where the virtual memory of the target process may include import dependency data of a marker library. An injection driver may be executed within the context of the target process when the marker library is loaded by the target process, where executing the injection driver within the context of the target process may enable the injection driver to modify virtual memory tables within the target process. The import dependency data of the marker library may be modified by the injection driver to include an injection library as a dependency of the marker library. After the modified import dependency data is used to load the injection library into the target process, the modified import dependency data may be reverted to an original state.

17 Claims, 4 Drawing Sheets

TARGET PROCESS INJECTION PRIOR TO EXECUTION OF MARKER LIBRARIES

RELATED APPLICATION

This application is a continuation of U.S. patent application Ser. No. 15/347,496, which was filed on 9 Nov. 2016, and the contents of which are herein incorporated by reference in their entirety for all purposes. U.S. patent application Ser. No. 15/347,496 claims the benefit of U.S. Provisional Application No. 62/253,531, which was filed 10 Nov. 2015, and the contents of which are herein incorporated by reference in their entirety for all purposes.

BACKGROUND

Field

The disclosed embodiments relate to techniques for executing applications. More specifically, the disclosed embodiments relate to techniques for performing injection of a dynamic library into a target process prior to execution of a marker library.

Related Art

A dynamic library may be injected into an application to influence the behavior of the application. One example of this is a profiling product, in which the injected software is used to profile running applications on a system. For example, a dynamic library may be injected into a target process to perform profiling of the target process because the library will have greater access to the process than an external application.

SUMMARY

A lock may be acquired on a virtual memory of a target process, where the virtual memory of the target process may include import dependency data of a marker library. An injection driver may be executed within the context of the target process when the marker library is loaded by the target process, where executing the injection driver within the context of the target process may enable the injection driver to modify virtual memory tables within the target process. The injection driver may modify the import dependency data of the marker library so that the import dependency data includes an injection library as a dependency of the marker library. After the modified import dependency data is used to load the injection library into the target process, the modified import dependency data may be reverted to an original state.

In some embodiments described herein, the injection library may be selected based on an environment of the target process, where the environment may include one or more of a processor architecture and a runtime version.

In some embodiments described herein, modifying the import dependency data of the marker library to include the injection library as the dependency of the marker library may include replacing an original dependency of the marker library in the import dependency data with the dependency on the injection library. In some embodiments described herein, reverting the import dependency data to the original state may include writing the original dependency back into the import dependency data prior to execution of the marker library.

In some embodiments described herein, modifying the import dependency data of the marker library to include the injection library as the dependency of the marker library may include modifying an import table in the import dependency data of the marker library to include the injection library.

In some embodiments described herein, the target process may be executed within a Windows operating system, and the injection driver may be executed at a passive level.

In some embodiments described herein, loading of the marker library may be detected.

In some embodiments described herein, modifying the import dependency data of the marker library may include detecting that a page table entry corresponding to the import dependency data does not exist, and performing a read operation on the page table entry.

In some embodiments described herein, a copy-on-write flag may be set for a set of virtual memory tables of the target process which include the import dependency data.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
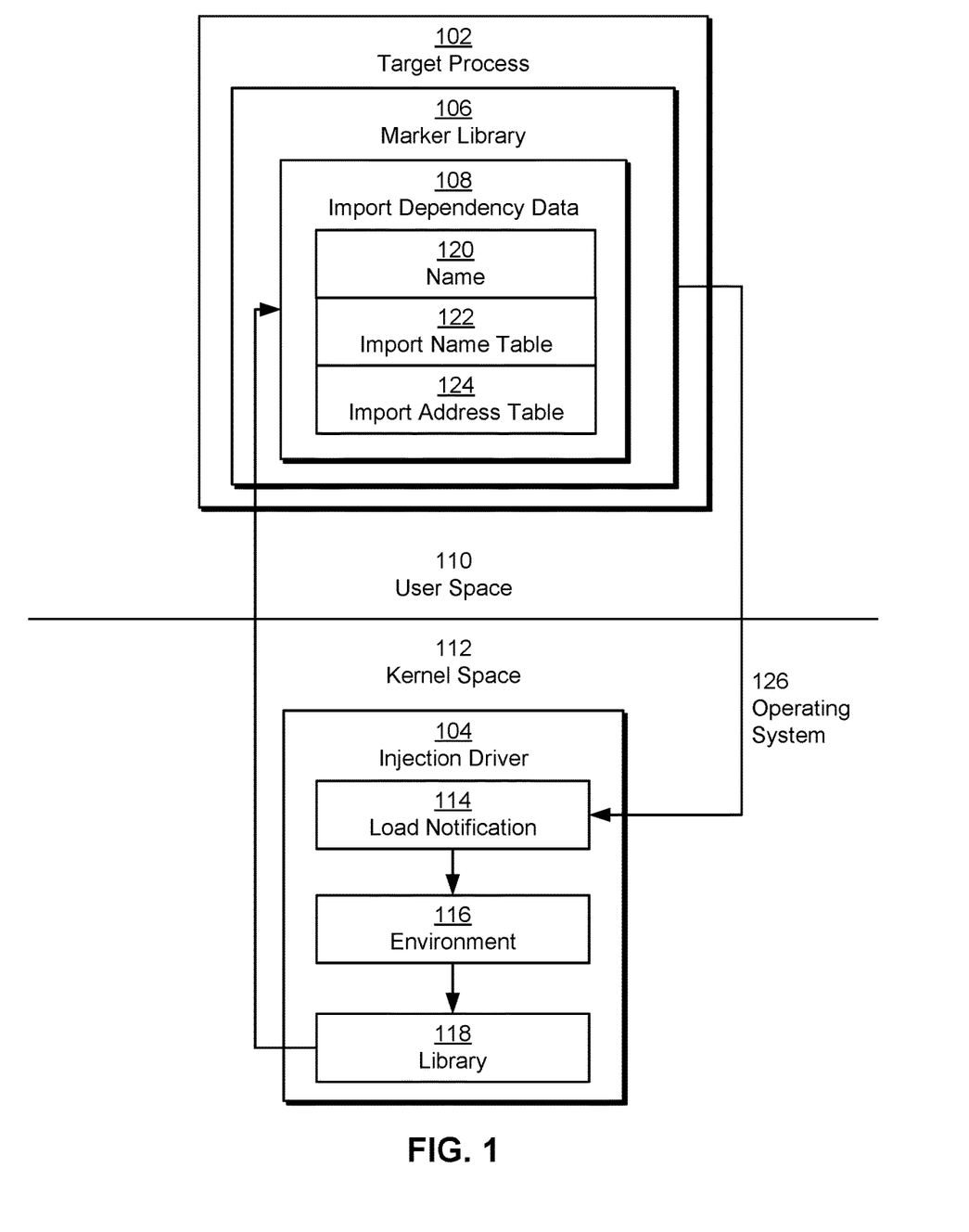
FIG. 1 shows a schematic of a system in accordance with the disclosed embodiments.

The disclosed embodiments provide a method, apparatus, and system for modifying execution of a target process in a computer system. As shown in FIG. 1, a target process 102 may execute within a user space 110 on an operating system 126 of a personal computer, laptop computer, tablet computer, mobile phone, portable media player, game console, server, workstation, and/or other type of computer system. As a result, target process 102 may be used to run an application, perform input/output (I/O), manipulate filesystem objects, and/or perform other tasks for a user of the computer system. In turn, target process 102 may use conventional mechanisms to request services and/or resources on the computer system by making system calls to an operating system kernel and/or one or more device drivers residing in a kernel space 112 on the computer system.

More specifically, the disclosed embodiments provide a method, apparatus, and system for performing early injection of libraries into target processes, such as target process 102. First, an injection driver 104 executing in kernel space 112 may identify target process 102 and/or other "target processes" in the computer system as processes that are targets of library injection. For example, injection driver 104 may classify processes in the computer system as executing within distinct runtime environments, such as a Java (Java™ is a registered trademark of Oracle America, Inc.) runtime environment and/or a Common Language Runtime (CLR) for .NET applications. Injection driver 104 may also, or instead, select target process 102 as a target of early library injection based on application name, user-specified criteria, and/or random sampling.

Injection driver 104 may be configured to receive a load notification 114 representing the loading of a module (e.g., library) by target process 102. For example, injection driver 104 may call "PsSetLoadImageNotifyRoutine" in a Microsoft Windows (Microsoft Windows™ is a registered trademark of Microsoft Corporation) operating system 126 to receive load notifications of modules loaded into any process in the computer system. In turn, load notification 114 may be generated by a loader, memory manager, kernel, and/or other operating system 126 component in kernel space 112 using a callback that occurs at "PASSIVE_LEVEL," which allows injection driver 104 to read and write virtual memory of target process 102.

After load notification 114 is received, injection driver 104 may analyze load notification 114 to determine if target process 102 is a target for library injection. More specifically, injection driver 104 may use a name and/or other attribute of a marker library 106 in load notification 114 to identify target process 102 as a target for library injection. Marker library 106 may be a library and/or other software module that is loaded dynamically during execution of target process 102. Certain marker libraries may be indicative of runtime environments and/or other attributes of processes that load the marker libraries, which in turn may allow the processes to be identified according to the attributes. Continuing with the previous example, injection driver 104 may use load notification 114 for a module with a name of "jvm.dll" to identify the corresponding process as embedding a Java Runtime Environment within a Microsoft Windows operating system 126. In other words, injection driver 104 may identify loading of a given marker library 106 by target process 102 as an indication that target process 102 belongs to a class of processes represented by marker library 106.

Because load notification 114 may be generated for both kernel and user-space modules, injection driver 104 may perform filtering of the notifications to remove notifications related to loading of kernel-space modules and use configurable logic to identify loaded modules representing the corresponding classes. For example, injection of libraries in the computer system may be configured by adding, removing, and/or modifying the names of marker libraries in processes to be targeted for injection from a configuration for injection driver 104. The configuration may map the marker libraries to one or more injection libraries to be injected into the corresponding target processes.

Next, injection driver 104 may select a library 118 for injection into target process 102 based on an environment 116 of target process 102. For example, environment 116 may include the processor architecture of target process 102, which may be identified as a 32-bit architecture or a 64-bit architecture. To identify the processor architecture of target process 102, injection driver 104 may inspect an architecture flag in an in-memory representation of the binary file format of marker library 106, which has already been mapped into target process 102 by a loader in operating system 126.

Import dependency data 108 may be a data structure that stores information used by a loader in operating system 126 to manage executable code for target process 102. For example, import dependency data 108 in a Windows operating system 126 may reside within a Portable Executable (PE) data structure that stores references to DLLs, import and export tables, resource management data, and/or thread local storage data for use by a loader in a Windows operating system 126. Within the PE, injection driver 104 may identify the processor architecture of marker library 106 from a "Magic" member of an "IMAGE-OPTIONAL_HEADER" structure. Injection driver 104 may then select a dynamic-link library (e.g., library 118) for injection into target process 102 to have the same processor architecture as marker library 106, and in turn, target process 102. Different versions of library 118 and/or symbolic links to the versions may also be placed in different system directories (e.g., "System32" or "SysWOW64") of operating system 126 according to the processor architecture of the versions. In another example, injection driver 104 may select library 118 for injection into target process 102 or choose to omit injection of library 118 into target process 102 based on a runtime version (e.g., Java Runtime Environment version), environmental variables, execution conditions, and/or other parameters associated with executing target process 102.

Those skilled in the art will appreciate that the receipt of load notification 114 during loading of marker library 106 may allow injection driver 104 to inject library 118 into target process 102 prior to execution of marker library 106. For example, load notification 114 may be generated during mapping of marker library 106 into the virtual address space of target process 102 and prior to importing the dependencies of marker library 106. As a result, library 118 may be used to make changes to marker library 106 and/or modify execution of target process 102 immediately after load notification 114 is used to identify library 118 for injection into target process 102. On the other hand, loading of marker library 106 may use system services or resources in a way that interferes with conventional mechanisms for injecting library 118 into target process 102. For example, loading of marker library 106 may involve mapping marker library 106 into the virtual address space of target process 102 and acquiring locks on the virtual memory of target process 102, which may prevent allocation of additional virtual memory by injection driver 104 and mapping of marker library 106 into the virtual address space of target process 102 at the same time.

To inject library 118 into target process 102 without requiring marker library 106 to finish loading, injection driver 104 may modify import dependency data 108 to include library 118 as a dependency of marker library 106. Prior to making the modifications, injection driver 104 may verify that pages of virtual memory to be modified in import dependency data 108 are writeable and that each process that loads marker library 106 has a private copy of the pages. Such verification may allow injection driver 104 to avoid modifying marker library 106 on disk; ensure that the modifications remain throughout the lifetime of target process 102; and selectively inject library 118, inject different versions of library 118, and/or omit injection of library 118 into different target processes that load marker library 106 (e.g., based on environment 116).

For example, injection driver 104 may ensure that a private copy of the virtual memory pages containing import dependency data 108 entries requiring modification exist for target process 102 by setting a copy-on-write flag for the respective pages in virtual memory of a Microsoft Windows operating system 126. The copy-on-write flag may cause the pages to be copied from disk or shared memory to the private copy for target process 102. Modifications to the pages may be applied only to target process 102, and other pages that are read-only may be paged in from disk or remain shared in memory. Thus, each process that is a target of injection may have a separate, private copy of pages in the import dependency data that are modified to enable injection of a given library (e.g., library 118), while processes that are not targets of injection may lack private or modified copies of the pages.

To set a copy-on-write flag for target process 102, injection driver 104 may execute at "PASSIVE LEVEL" within the context of target process 102 to modify virtual memory tables within target process 102. As mentioned above, such execution may be enabled by a callback that is registered using "PsSetLoadImageNotifyRoutine" by injection driver 104. Within the virtual memory tables, injection driver 104 may verify that page table entries have been created for pages of import dependency data 108 that are to be modified by calculating the page table entries from virtual addresses for the pages and a base address for the page table entries. If the page table entries do not yet exist, the injection driver 104 may perform a read operation on each page of the import dependency data 108 that is to be modified, to force creation of the page table entries to be further inspected. Next, injection driver 104 may assess the status of the copy-on-write flag for each of the page table entries. If the copy-on-write flag is not set for a given page table entry, injection driver 104 may set the copy-on-write flag by writing the appropriate value to the page table entry.

After verifying that target process 102 has a private copy of pages to be modified in import dependency data 108, injection driver 104 may modify the pages so that library 118 is included as a dependency of marker library 106. Since injection driver 104 is unable to allocate virtual memory while marker library 106 is loading, injection driver 104 may add library 118 to import dependency data 108 by modifying data in import dependency data 108 instead of adding data to import dependency data 108.

In one or more embodiments, injection driver 104 modifies import dependency data 108 to include library 118 by replacing an original dependency of marker library 106 in import dependency data 108 with a dependency on library 118. For example, injection driver 104 may replace a dependency shared by all marker libraries, such as a dependency on a "kernel32.dll" module in a Windows operating system 126, with a dependency on library 118.

To create the dependency on library 118 in import dependency data 108, injection driver 104 may replace the name of the original dependency with the name of library 118. Continuing with the previous example, injection driver 104 may replace a dependency on "kernel32.dll" with the name of library 118, which is selected to be shorter than or equal to "kernel32.dll" to avoid additional memory consumption. Next, injection driver 104 may modify an import table in import dependency data 108 to include library 118. For example, injection driver 104 may modify the first entry in an Import Name Table (INT) 122 to an export, by ordinal or name (if the name is not longer than the original import name), of library 118. The value stored in the first entry of INT 122 may be calculated to be the ordinal ORed with an image ordinal flag for the processor architecture of marker library 106. If an Import Address Table (IAT) 124 exists, injection driver 104 may also modify the first entry to be the same value as that of the modified first entry in INT 122. Injection driver 104 may then modify the second entry of INT 122 and IAT 124 (if IAT 124 exists) to null to terminate the list of entries in each table. By using import by ordinal instead of import by name in the modifications to INT 122 and IAT 124, injection driver 104 may reduce the number of changes made to import dependency data 108 and the amount of space occupied by the changes.

Conversely, injection driver 104 may modify import dependency data 108 for all processes that load marker library 106 to include library 118. This is achieved by injection driver 104 not setting the copy-on-write flag for modified pages of import dependency data 108 for marker library 106. After injection library 118 is loaded, injection library 118 may modify pages of import dependency data 108 to become copy-on-write and revert INT 122, IAT 124, and name 120 to the original values (i.e., values stored in import dependency data 108 prior to selecting target process 102 for injection of library 118). If injection library 118 determines that a process should not be subsequently modified (e.g., due to environment 116 and/or other factors), injection driver 118 will not perform any other tasks and become dormant within target process 102 as if injection had not occurred.

Such changes to import dependency data 108 by injection driver 104 may cause the loader to load library 118 as a dependency of marker library 106 and execute library 118 before marker library 106. For example, a loader in a Windows operating system 126 may use name 120, INT 122, and/or IAT 124 in import dependency data 108 to load library 118 and/or other dependencies of marker library 106 after marker library 106 has finished loading. Next, the loader may call a library-defined entry point on the modules in the reverse order in which the modules were loaded, allowing library 118 to possibly make changes to marker library 106 and/or import dependency data 108 before marker library 106 executes.

During execution, library 118 may revert import dependency data 108 to its original state by writing the original dependency back into name 120, INT 122, and/or IAT 124.

For example, library 118 may write values associated with the "kernel32.dll" module back into name 120, INT 122, and/or IAT 124. Values associated with the original dependency in INT 122 may be retrieved from marker library 106 on disk, and values associated with the original dependency in IAT 124 may be calculated and written to IAT 124 as virtual addresses, where each virtual address is the sum of the original dependency base address and an offset into the base address that is stored in an exports table located within the original dependency. Performing the fixups within IAT 124 ensures the correct operation of marker library 106.

After import dependency data 108 is reverted to its original state, library 118 may make additional modifications to marker library 106 and/or other components of target process 102. For example, library 118 may instrument, profile, and/or monitor target process 102 and/or call one or more additional libraries to perform such instrumentation, profiling, and/or monitoring. In another example, library 118 and/or the additional libraries may modify environment variables and/or other aspects of environment 116 prior to execution of marker library 106. In a third example, library 118 and/or the additional libraries may apply a patch, export hook, and/or another behavioral modification to marker library 106 and/or another component of target process 102 prior to execution of the component.

Consequently, the system of FIG. 1 may perform secure, selective injection of libraries into target processes based on attributes and/or environments of the target processes. Moreover, execution of the injection libraries before marker libraries used to identify the classes may increase the amount of flexibility and control associated with library injection without requiring modifications to existing libraries of the target processes on disk.

Figure 2:
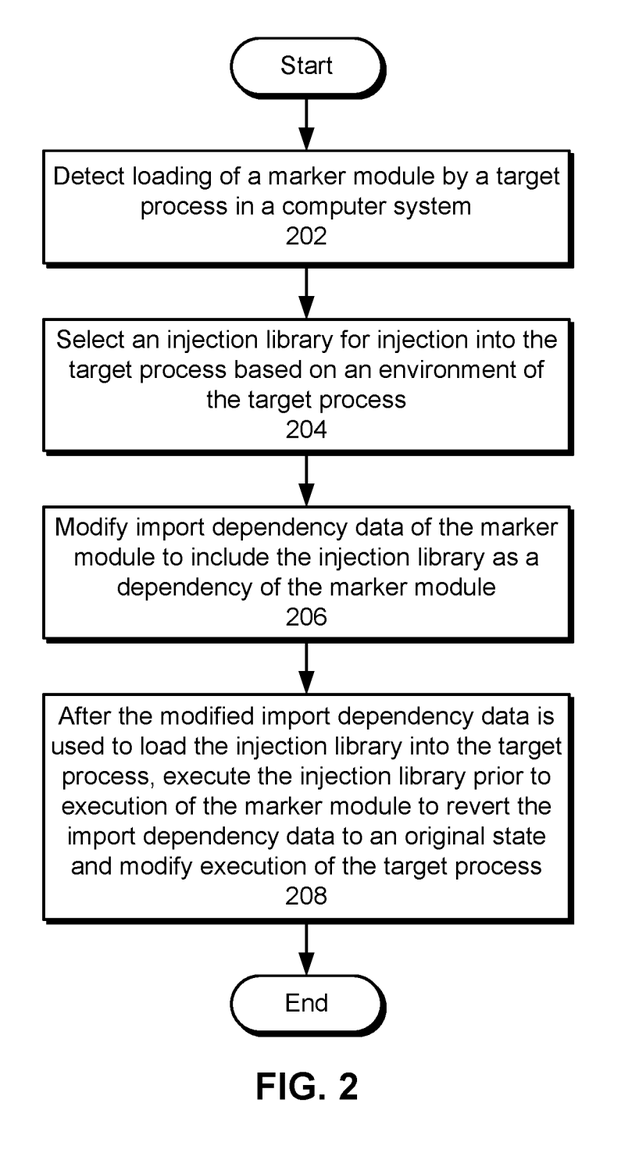
FIG. 2 shows a flowchart illustrating the process of modifying execution of a target process in a computer system in accordance with the disclosed embodiments.

FIG. 2 shows a flowchart illustrating the process of modifying execution of a target process in a computer system in accordance with the disclosed embodiments. In one or more embodiments, one or more of the steps may be omitted, repeated, and/or performed in a different order. Accordingly, the specific arrangement of steps shown in FIG. 2 should not be construed as limiting the scope of the technique.

Initially, loading of a marker library by a target process in a computer system is detected (operation 202). For example, a kernel-mode injection driver may detect loading of the marker library through a load notification from the operating system of the computer system. Next, an injection library is selected for injection into the target process based on an environment of the target process (operation 204). For example, the injection library may be selected to conform to a processor architecture, runtime version, and/or other environmental attribute associated with executing the target process and/or other processes in the computer system. Alternatively, no library may be selected if the environment of the target process is not compatible with existing injectable libraries and/or otherwise indicates that the target process is not a candidate for library injection.

Import dependency data of the marker library is then modified to include the injection library as a dependency of the marker library (operation 206), as described in further detail below with respect to FIG. 3. After the modified import dependency data is used to load the injection library into the target process (e.g., using a loader in the operating system), the injection library is executed prior to execution of the marker library to revert the import dependency data to an original state and modify execution of the target process (operation 208). For example, the injection library may first revert the import dependency data to its original state to allow original dependencies of the marker library to be used correctly. Next, the injection library and/or another library loaded by the injection library may modify execution of the target process by profiling the target process, modifying the environment or behavior of the target process, and/or otherwise making changes to the code or runtime of the target process.

Figure 3:
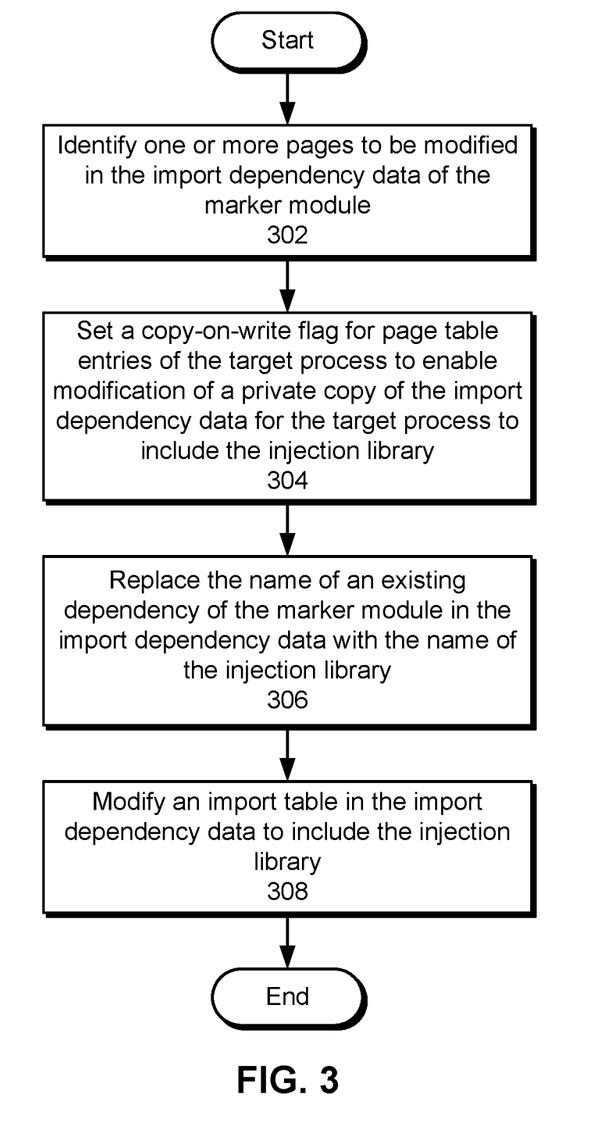
FIG. 3 shows a flowchart illustrating the process of modifying import dependency data of a marker library to include an injection library as a dependency of the marker library in accordance with the disclosed embodiments.

FIG. 3 shows a flowchart illustrating the process of modifying import dependency data of a marker library to include an injection library as a dependency of the marker library in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, one or more pages to be modified in the import dependency data of the marker library are identified (operation 302). The pages may store a name, INT, and/or IAT associated with one or more dependencies of the marker library. Next, a copy-on-write flag for the page(s) is set in page table entries of the target process to enable modification of a private copy of the import dependency data for the target process to include the injection library (operation 304). The name of an original dependency of the marker library in the import dependency data is then replaced with the name of the injection library (operation 306), and an import table (e.g., INT and/or IAT) in the import dependency data is modified to include the injection library (operation 308). The modifications may be performed without increasing the use of virtual memory, thus allowing the injection library to be loaded and executed before the marker library is executed. After the injection library is loaded as a result of the modified import dependency data, the injection library may revert the import dependency data to its original state, as discussed above.

Figure 4:
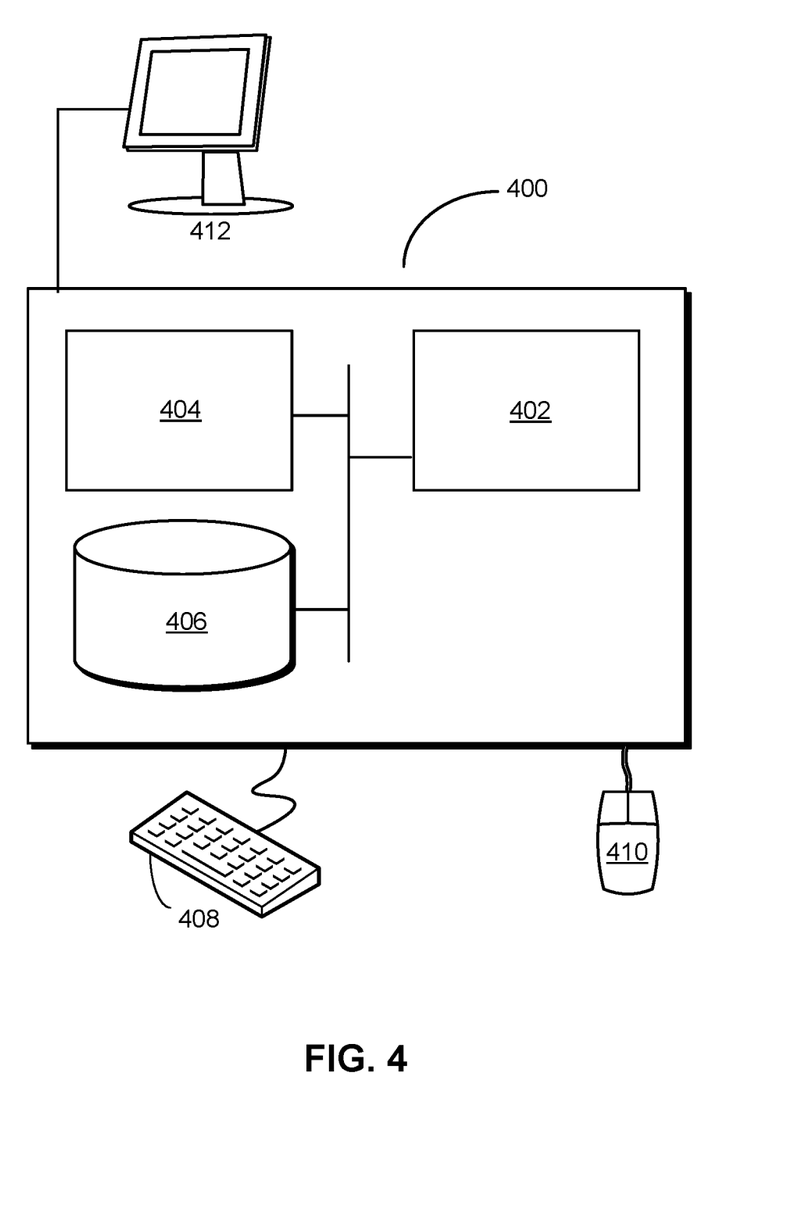
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for modifying execution of a target process. The system includes a kernel-mode injection driver that detects loading of a marker library by the target process. Next, the injection driver may modify import dependency data of the marker library to include an injection library as a dependency of the marker library during loading of the marker library by the target process. The system also includes the injection library. After the modified import dependency data is used to load the injection library into the target process, the injection library executes prior to execution of the marker library to revert the import dependency data to an original state and modify execution of the target process.

In addition, one or more components of computer system 400 may be remotely located and connected to the other components over a network. Portions of the present embodiments (e.g., injection driver, marker library, injection library, target process, etc.) may also be located on different nodes of a distributed system that implements the embodiments. For example, the present embodiments may be implemented using a cloud computing system that performs classification of target processes on remote computer systems and injects libraries into the target processes based on the classification.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    acquiring a lock on a virtual memory of a target process which executes on a processor, wherein the virtual memory of the target process includes import dependency data of a marker library;
    executing an injection driver at a passive level within the context of the target process when the marker library is loaded by the target process, wherein the executing the injection driver at the passive level within the context of the target process enables the injection driver to modify virtual memory tables within the target process;
    modifying, by the injection driver, the import dependency data of the marker library to include an injection library as a dependency of the marker library, wherein a read operation is performed on a page table entry corresponding to the import dependency data in response to detecting that the page table entry does not exist; and
    after the modified import dependency data is used to load the injection library into the target process, reverting the modified import dependency data to an original state, wherein loading the injection library into the target process modifies execution of the target process.

2. The method of claim 1, wherein the injection library is selected based on an environment of the target process, wherein the environment includes at least one of:
    a processor architecture; and
    a runtime version.

3. The method of claim 1, wherein modifying the import dependency data of the marker library to include the injection library as the dependency of the marker library comprises:
    replacing an original dependency of the marker library in the import dependency data with the dependency on the injection library.

4. The method of claim 3, wherein reverting the import dependency data to the original state comprises:
    writing the original dependency back into the import dependency data prior to execution of the marker library.

5. The method of claim 1, wherein modifying the import dependency data of the marker library to include the injection library as the dependency of the marker library comprises:
    modifying an import table in the import dependency data of the marker library to include the injection library.

6. The method of claim 1, wherein the target process executes within a Windows operating system, and wherein the injection driver executes at a passive level.

7. The method of claim 1, further comprising detecting loading of the marker library.

8. The method of claim 1, further comprising setting a copy-on-write flag for a set of virtual memory tables of the target process which includes the import dependency data.

9. A non-transitory computer-readable storage medium comprising stored instructions, which when executed by a processor, cause the processor to:
    acquire a lock on a virtual memory of a target process, wherein the virtual memory of the target process includes import dependency data of a marker library;
    execute an injection driver at a passive level within the context of the target process when the marker library is loaded by the target process, wherein the executing the injection driver at the passive level within the context of the target process enables the injection driver to modify virtual memory tables within the target process;
    modify the import dependency data of the marker library to include an injection library as a dependency of the marker library, wherein a read operation is performed on a page table entry corresponding to the import dependency data in response to detecting that the page table entry does not exist; and
    after the modified import dependency data is used to load the injection library into the target process, revert the modified import dependency data to an original state, wherein loading the injection library into the target process modifies execution of the target process.

10. The non-transitory computer-readable storage medium of claim 9, wherein the injection library is selected based on an environment of the target process, wherein the environment includes at least one of:
    a processor architecture; and
    a runtime version.

11. The non-transitory computer-readable storage medium of claim 9, wherein modifying the import dependency data of the marker library to include the injection library as the dependency of the marker library comprises:
    replacing an original dependency of the marker library in the import dependency data with the dependency on the injection library.

12. The non-transitory computer-readable storage medium of claim 11, wherein reverting the import dependency data to the original state comprises:
    writing the original dependency back into the import dependency data prior to execution of the marker library.

13. The non-transitory computer-readable storage medium of claim 9, wherein modifying the import dependency data of the marker library to include the injection library as the dependency of the marker library comprises:
    modifying an import table in the import dependency data of the marker library to include the injection library.

14. The non-transitory computer-readable storage medium of claim 9, wherein the target process executes within a Windows operating system, and wherein the injection driver executes at a passive level.

15. The non-transitory computer-readable storage medium of claim 9, wherein the instructions, which when executed by the processor, cause the processor to detect loading of the marker library.

16. The non-transitory computer-readable storage medium of claim 9, wherein the instructions, which when executed by the processor, cause the processor to set a copy-on-write flag for a set of virtual memory tables of the target process which includes the import dependency data.

17. An apparatus comprising:
   a memory storing instructions; and
   a processor, coupled with the memory and to execute the instructions, the instructions when executed cause the processor to:
   acquire a lock on a virtual memory of a target process, wherein the virtual memory of the target process includes import dependency data of a marker library;
   execute an injection driver at a passive level within the context of the target process, wherein the executing the injection driver at a passive level within the context of the target process enables the injection driver to modify virtual memory tables within the target process;
   detect loading of the marker library;
   modify the import dependency data of the marker library to include an injection library as a dependency of the marker library, wherein a read operation is performed on a page table entry corresponding to the import dependency data in response to detecting that the page table entry does not exist; and
   after the modified import dependency data is used to load the injection library into the target process, revert the modified import dependency data to an original state, wherein loading the injection library into the target process modifies execution of the target process.

* * * * *